(12) United States Patent
Vahidi et al.

(10) Patent No.: US 8,478,500 B1
(45) Date of Patent: Jul. 2, 2013

(54) SYSTEM AND METHOD FOR UTILIZING TRAFFIC SIGNAL INFORMATION FOR IMPROVING FUEL ECONOMY AND REDUCING TRIP TIME

(75) Inventors: Ardalan Vahidi, Greenville, SC (US); Grant David Mahler, Los Altos Hills, CA (US)

(73) Assignee: Clemson University, Clemson, SC (US)

( * ) Notice: Subject to any disclaimer, the term of this patent is extended or adjusted under 35 U.S.C. 154(b) by 341 days.

(21) Appl. No.: 12/872,567

(22) Filed: Aug. 31, 2010

Related U.S. Application Data (60) Provisional application No. 61/238,865, filed on Sep. 1, 2009.

(51) Int. Cl.
*B60T 8/32* (2006.01)
*G08G 1/00* (2006.01)

(52) U.S. Cl.
USPC .............................................. 701/93; 340/932

(58) Field of Classification Search
USPC ............ 701/93, 408; 340/936, 937, 903–905, 340/916
See application file for complete search history.

(56) References Cited

U.S. PATENT DOCUMENTS

| | | | |
|---|---|---|---|
| 6,166,658 A * | 12/2000 | Testa ................................. | 701/93 |
| 6,401,024 B1 | 6/2002 | Tange et al. | |
| 6,442,473 B1 | 8/2002 | Berstis et al. | |
| 6,516,262 B2 * | 2/2003 | Takenaga et al. ................ | 701/96 |
| 6,728,623 B2 * | 4/2004 | Takenaga et al. ................ | 701/96 |
| 6,825,778 B2 | 11/2004 | Bergen et al. | |
| 6,989,766 B2 * | 1/2006 | Mese et al. ..................... | 340/907 |
| 6,990,401 B2 | 1/2006 | Neiss et al. | |
| 7,187,301 B2 | 3/2007 | Lu | |
| 7,317,973 B2 * | 1/2008 | Dieterle .......................... | 701/23 |
| 7,466,227 B2 | 12/2008 | Chen et al. | |
| 2003/0016143 A1 | 1/2003 | Ghazarian | |
| 2008/0012726 A1 | 1/2008 | Publicover | |
| 2008/0030372 A1 | 2/2008 | Lu | |
| 2008/0071460 A1 | 3/2008 | Lu | |
| 2010/0204896 A1 * | 8/2010 | Biondo et al. .................. | 701/93 |
| 2012/0116642 A1 * | 5/2012 | Mitake et al. ................... | 701/93 |
| 2013/0013164 A1 * | 1/2013 | Taguchi .......................... | 701/96 |

* cited by examiner

*Primary Examiner* — Patrick Cicchino
(74) *Attorney, Agent, or Firm* — John R. Perkins, Jr.; Perkins Law Firm, LLC (57) ABSTRACT

A system and method for utilizing traffic signal information to reduce wait time at traffic signals and to reduce fuel use is disclosed. Traffic signal timing data can be received from traffic signals or from a central server to determine a reference velocity for a vehicle to travel through a plurality of traffic signals. The reference velocity can then be provided to the driver so that the driver can manually control the vehicle at a velocity close to the reference velocity. The techniques of the present disclosure also can be used in connection with a cruise control system to control the velocity of a vehicle to be close to the reference velocity.

20 Claims, 5 Drawing Sheets

SYSTEM AND METHOD FOR UTILIZING TRAFFIC SIGNAL INFORMATION FOR IMPROVING FUEL ECONOMY AND REDUCING TRIP TIME

PRIORITY CLAIM

The present application claims the benefit of priority of U.S. Provisional Patent Application No. 61/238,865, filed Sep. 1, 2009, which is incorporated herein by reference for all purposes.

FEDERALLY SPONSORED RESEARCH AND DEVELOPMENT

This invention was made with government support under grant number 0928533 awarded by the National Science Foundation. The government has certain rights in the invention.

FIELD

The present disclosure relates generally to an intelligent transportation system and method and more particularly to a system and method that utilizes traffic signal information to determine optimal or improved vehicle velocity through a plurality of traffic signals.

BACKGROUND

Traffic signals are located on roadways throughout the world to control the flow of traffic through intersections and other areas. A typical traffic signal includes three phases—a red phase, a green phase, and a yellow or amber phase. A red traffic signal typically indicates that traffic facing the traffic signal should stop and not enter the intersection. A green traffic signal typically indicates that traffic facing the traffic signal is free to pass through the intersection. An amber or yellow traffic signal provides a warning that the traffic signal is soon going to turn red.

A typical driver spends significant time idling in traffic. A lot of this time is spent idling behind traffic signals. To address this situation, advanced traffic signal control methods such as traffic-actuated signals and signal synchronization have been utilized. However, these control methods are typically very costly to implement and maintain. Even with these control methods in place, drivers typically cruise at full speed toward a green traffic signal and have to come to a sudden halt whenever the traffic signal turns red. This increases fuel use, engine and brake wear, and sometimes trip time. If traffic signal timing and position are known, the velocity (speed) of a vehicle can be planned through the traffic signals to reduce idle time at red. This can lead to lower fuel use, emissions, engine and brake wear, and in certain circumstances reduced trip time.

Intelligent traffic signal systems that transmit the future state of traffic signals to vehicles are known. For instance, researchers are now experimenting with transmitting the future state of traffic signals to vehicles within the Cooperative Intersection Collision Avoidance Systems (CICAS) initiative. R. Sengupta, S. Rezaei, S. Shladover, D. Cody, S. Dickey, and H. Krishnan, "Cooperative collision warning systems: Concept definition and experimental implementation," *Journal of Intelligent Transportation Systems: Technology, Planning, and Operations*, vol. 11, no. 3, pp. 143-155 (2007); C.-Y Chan and B. Bougler, "Evaluation of cooperative roadside and vehicle-based data collection for assessing intersection conflicts," in *Proceedings of IEEE Intelligent Vehicles Symposium*, pp. 165-170 (2005).

Adaptive cruise control systems that determine control inputs to control brake force and engine force of a vehicle based on, for example, distance between the vehicle and a vehicle traveling in front of the vehicle are also known. These adaptive cruise control systems do not take into account future traffic signal information to control vehicle velocity through a plurality of traffic signals based at least in part on the future traffic signal information.

U.S. Patent Application Publication No. 2003/0016143 discloses an intersection vehicle collision avoidance system that provides alerts to vehicle operators based on various conditions as the vehicle operators approach an intersection.

U.S. Pat. No. 6,989,766 discloses a smart traffic signal system in which traffic signal data is broadcast for receipt by vehicles traversing the roadways controlled by the traffic signals. The traffic signals can have the capability to broadcast their location, status, changing cycles and timing data. A receiving system in a vehicle is configured to receive the traffic signal data and provide to a user of the vehicle visual display information and/or audible information informing the user of a velocity range which, if followed, provides a speed for traveling through a traffic signal.

All of the foregoing patents and patent publications are hereby incorporated by reference for all purposes.

While various intelligent traffic signal systems and methods have been developed, no system or methodology has emerged that generally encompasses all of the desired characteristics as presented herein in accordance with exemplary embodiments of the present invention.

SUMMARY

Aspects and advantages of the invention will be set forth in part in the following description, or may be obvious from the description, or may be learned through practice of the invention.

One exemplary embodiment of the present disclosure is directed to a method for determining a velocity for a vehicle traveling through a plurality of traffic signals. The method includes receiving first traffic signal data associated with a first traffic signal; receiving second traffic signal data associated with a second traffic signal; receiving GPS information, such as location information, associated with the vehicle; and determining a reference velocity for traveling through the first and second traffic signal without having to stop at a red signal. The reference velocity is determined based at least in part on the first traffic signal data and the second traffic signal data.

In a particular implementation of this exemplary embodiment, determining the reference velocity can include: determining a first range of velocities for traveling through the first traffic signal without having to stop at a red signal based at least in part on the first traffic signal data and the GPS information; determining a second range of velocities for traveling through the second traffic signal without having to stop at a red signal based at least in part on the second traffic signal data and the GPS information; comparing the first range of velocities with the second range of velocities to determine a first set intersection between the first range of velocities and the second range of velocities. The first set intersection includes a range of potential reference velocities for traveling through the first traffic signal and the second traffic signal without having to stop at a red signal. The method further includes selecting the reference velocity from the first set intersection. In a particular embodiment, selecting the reference velocity from the first set intersection can include selecting the reference velocity equal to the highest velocity in the first set intersection.

In a variation of this exemplary embodiment, the reference velocity can be determined based at least in part taking into account speed limit constraints. In another variation of this exemplary embodiment, the method can include receiving updated GPS information associated with the vehicle and updating the reference velocity based on the updated GPS information. In still another variation of this exemplary embodiment, the method can include determining at least one control input for a cruise control system for maintaining vehicle velocity at a controlled vehicle velocity that is substantially equal to the reference velocity. The at least one control input can be determined based at least in part on speed limit constraints, braking force constraints, engine force constraints, or a minimum distance between the vehicle and a vehicle traveling in front of the vehicle.

In a further variation of this exemplary embodiment, the first traffic signal data can be received from the first traffic signal and the second traffic signal data can be received from the second traffic signal. Alternatively, the first and second traffic signal data can be received from a central server. The central server can be configured to sort and select which traffic signal data is received based at least in part on GPS information.

In still a further variation of this exemplary embodiment, the method further includes: receiving traffic signal data from one or more additional traffic signals; determining a range of velocities to pass through each of the one or more additional traffic signals without having to stop at a red signal based at least in part on the traffic signal data associated with the one or more additional traffic signals; and comparing the first set intersection with the range of velocities to determine a second set intersection between the first set intersection and the range of velocities. In this manner, the second set intersection includes a range of potential reference velocities for traveling through the first traffic signal, the second traffic signal, and the one or more additional traffic signals without having to stop at a red signal.

Another exemplary embodiment of the present disclosure is directed to a system for determining a reference velocity for a vehicle traveling through a plurality of traffic signals. The system includes a remote device associated with the vehicle and a central server in communication with the remote device. The central server includes a database configured to store first traffic signal data associated with a first traffic signal and second traffic signal data associated with a second traffic signal. The central server is further configured to receive GPS information, such as location information, associated with the vehicle from the remote device. The system further includes a processor in communication with the central server. The processor is configured to execute computer readable instructions stored on a computer readable medium to determine a reference velocity for traveling through the first and second traffic signal without having to stop at a red signal. The reference velocity is determined based at least in part on the first traffic signal data and the second traffic signal data.

In a particular implementation of this exemplary embodiment, the processor is configured to execute computer readable instructions stored on a computer readable medium to: determine a first range of velocities for traveling through the first traffic signal without having to stop at a red signal based at least in part on the first traffic signal data and the GPS information; determine a second range of velocities for traveling through the second traffic signal without having to stop at a red signal based at least in part on the second traffic signal data and the GPS information; compare the first range of velocities with the second range of velocities to determine a set intersection between the first range of velocities and the second range of velocities. The set intersection includes a range of potential reference velocities for traveling through the first traffic signal and the second traffic signal. The processor is further configured to select the reference velocity from the set intersection.

In a variation of this exemplary embodiment, the central server can be configured to communicate the reference velocity to the remote device. In another variation of this exemplary embodiment, the remote device can be coupled to a cruise control system. The cruise control system can be configured to control the velocity of the vehicle to be substantially equal to the reference velocity. The processor can be configured to determine at least one control input for the cruise control system. The at least one control input can be determined based at least in part on speed limit constraints, braking force constraints, engine force constraints, or a minimum distance between the vehicle and a vehicle traveling in front of the vehicle.

In still a further variation of this exemplary embodiment, the remote device can be an electronic device, such as a smart phone, that includes an application adapted to: connect to the central server; provide the GPS information to the central server; and receive the reference velocity from the central server. Alternatively, the remote device can be an electronic device, such as a smart phone, that includes an application adapted to: connect to the central server; receive first traffic signal data associated with a first traffic signal from the central server; receive second traffic signal data associated with a second traffic signal from the central server; and determine a reference velocity for traveling through the first and second traffic signal without having to stop at a red signal based at least in part on the first traffic signal data and the second traffic signal data.

A further exemplary embodiment of the present disclosure is directed to a system for determining a reference velocity for a vehicle traveling through a plurality of traffic signals. The system includes a communication device operable to receive first traffic signal data associated with a first traffic signal and second traffic signal data associated with a second traffic signal and a GPS module adapted to determine the location of the vehicle. The system further includes a processor configured to receive the first and second traffic signal data from the communication device and to receive GPS information, such as location information, from the GPS module. The processor is configured to execute computer readable instructions stored on a computer readable medium to determine a reference velocity for traveling through the first and second traffic signal without having to stop at a red signal based at least in part on the first traffic signal data and the second traffic signal data.

In a variation of this exemplary embodiment, the communication device can be configured to receive first traffic signal data from the first traffic signal and second traffic signal data from the second traffic signal. In another variation of this exemplary embodiment, the communication device can be configured to receive first traffic signal data and second traffic signal data from a central server. In a further variation of this exemplary embodiment, the system can be coupled to a cruise control system. The processor can be configured to determine at least one control input for the cruise control system. The at least one control input can be based at least in part on speed limit constraints, braking force constraints, engine force constraints, or minimum distance between the vehicle and a vehicle traveling in front of the vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the other computer uses to access the actual data from a still further computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. For instance, a central server or remote device may comprise one or more computer systems that can provide functionality as discussed herein. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

As used herein, the term vehicle velocity is intended to refer to the speed of a vehicle and may or may not include the direction the vehicle is traveling. The term reference velocity is intended to refer a velocity determined according to one or more of the methods described herein at which a vehicle can travel through one or more traffic signals without having to stop at a red signal. The tam velocity profile is intended to refer to one or more reference velocities associated with a particular route a vehicle is traveling.

Generally, the present disclosure is directed to systems and methods for utilizing traffic signal information to reduce wait time at traffic signals and to reduce fuel use. In a particular embodiment, traffic signal timing data can be received directly from intelligent traffic signals. The traffic signal data can be received at a vehicle and used to determine a reference velocity for the vehicle to travel through a plurality of traffic signals. Alternatively, traffic signal timing data can be uploaded to a central server. A remote device, such as a smart phone or PDA, can access the central server and request a reference velocity or velocity profile for a particular route based on the traffic signal timing data. The central server can determine a reference velocity and communicate the reference velocity to the remote device. The remote device can then display the reference velocity to the driver so that the driver can manually control the vehicle at a velocity close to the reference velocity. The techniques of the present disclosure also can be used in connection with a cruise control system to control the velocity of a vehicle in accordance with the velocity profile to improve fuel economy, reduce signal wait time, and enable traffic avoidance.

Figure 1:
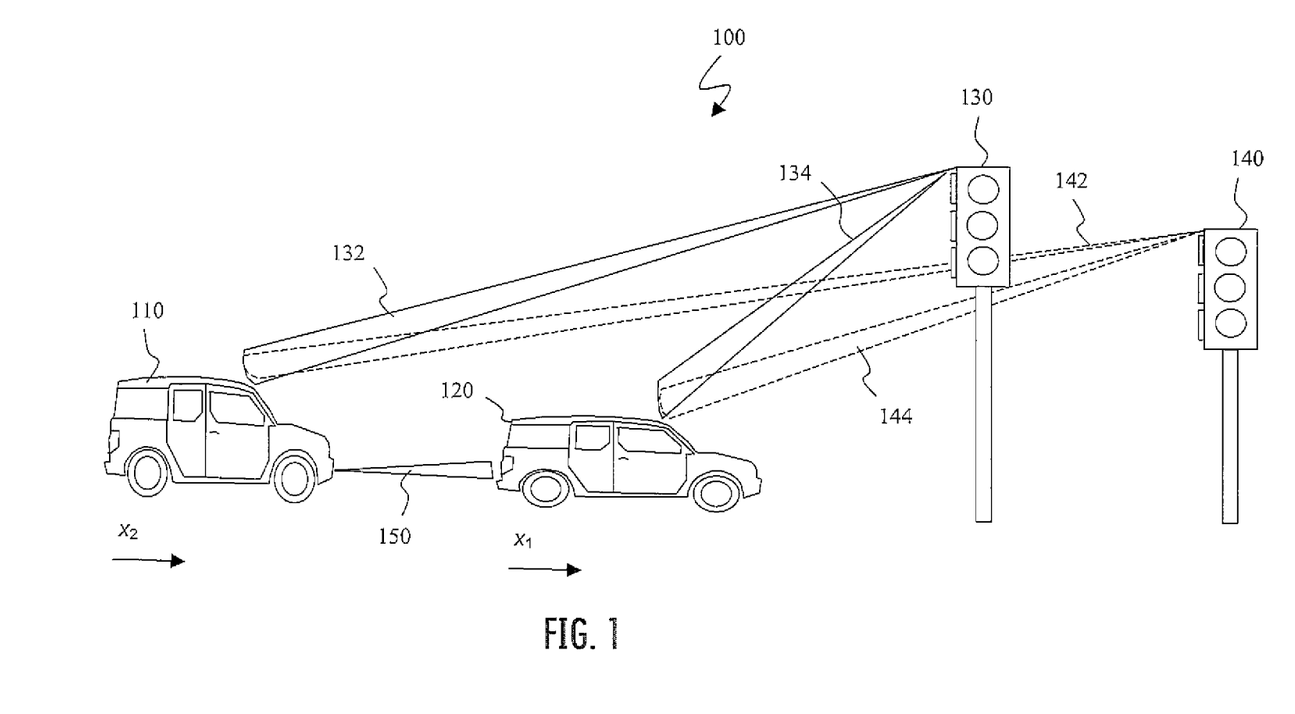
FIG. 1 illustrates an exemplary system according to an exemplary embodiment of the present disclosure.

FIG. 1 illustrates an exemplary intelligent traffic system 100 according to an exemplary embodiment of the present disclosure. In the intelligent traffic system 100 of FIG. 1, traffic signal data is received at a vehicle directly from a plurality of different traffic signals. For instance, as illustrated in FIG. 1, intelligent traffic system 100 includes a plurality of traffic signals, such as first traffic signal 130 and second traffic signal 140. First traffic signal 130 and second traffic signal 140 transmit traffic signal data to exemplary vehicles 110 and 120 for use in determining a velocity profile through the first and second traffic signals 130 and 140 in accordance with embodiments of the present disclosure. Traffic signal data can include the position of the traffic signal, timing information for the traffic signal, phase information for the traffic signal and other suitable data. The traffic signal data can be transmitted to vehicles via radio, wifi, cellular networks, using Dedicated Short Range Communication (DSRC) protocol, or other suitable network or communications medium.

The transmission of traffic signal data to vehicles 110 and 120 is graphically represented in FIG. 1. As illustrated, vehicle 110 receives traffic signal data 132 from first traffic signal 130 and traffic signal data 142 from second traffic signal 140. Vehicle 120 receives traffic signal data 134 from first traffic signal 130 and traffic signal data 144 from second traffic signal 140. Vehicles 110 and 120 may each include a system (not illustrated in FIG. 1) that is adapted to receive the traffic signal data and use the traffic signal data to determine a velocity profile through the plurality of traffic signals 130 and 140. The system can also be used in connection with a cruise control system to automatically control the velocity of vehicles 110 and 120.

FIG. 1 also illustrates that vehicle 110 can include a sensing device, such as a laser or radar, that transmits a sensing signal 150 to determine the distance to vehicle 120. The distance between vehicle 110 and vehicle 120 can be used in accordance with certain embodiments of the present disclosure as a constraint in determining a velocity profile through the plurality of traffic signals 130 and 140. The sensing device can be any sensor or other device adapted to determine the distance between vehicle 110 and vehicle 120 and can, for instance, be part of an adaptive cruise control system for a vehicle.

Figure 2:
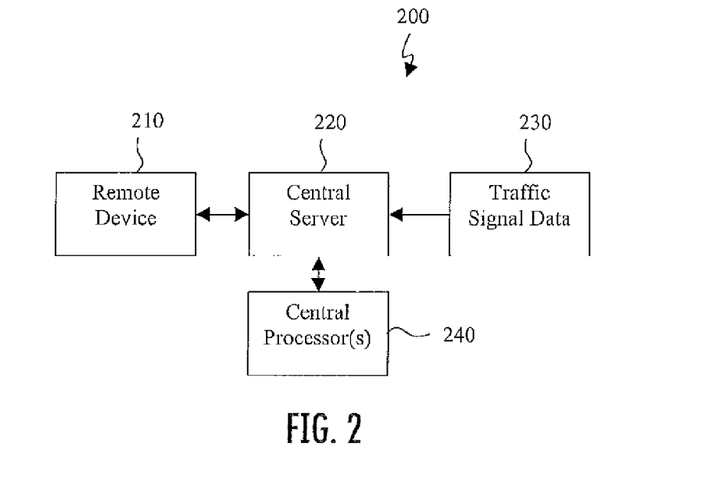
FIG. 2 depicts a block diagram of an exemplary system according to an exemplary embodiment of the present disclosure.

FIG. 2 provides a block diagram of an alternative embodiment in which traffic signal data is uploaded and accessed from a central server. In the system 200 of FIG. 2, traffic signal data 230 is provided to a central server 220. Traffic signal data 230 can be stored in a database at central server 220 using any suitable storage medium. The traffic signal data 230 can be obtained from a traffic control center, or directly uploaded to central server 220 from a plurality of traffic signals. The central server 220 can be accessed over a network by a remote device 210, such as a smart phone, PDA, or other remote device, to obtain traffic signal data and/or vehicle trajectories based on the traffic signal data. Remote device 210 can be a portable device or can be integrated or retrofitted into a vehicle. The remote device 210 can include an application, such as a smart phone application, that initiates communication with central server 220 and requests velocity profile information from central server 220

In a particular embodiment, remote device 210 transmits GPS and route information to central server 220. After receiving GPS and route information, central server 220 can provide the traffic signal data, location information, and route information to central processor(s) 240 to determine a velocity profile through a plurality of traffic signals associated with the route. Central processor(s) 240 can be adapted to determine a velocity profile and reference velocity according to the methods and techniques discussed in detail below.

After central processor(s) 240 has determined a velocity profile, the velocity profile is communicated to central server 220 and then to remote device 210. Remote device 210 then provides, either through visual display or audio communication, the reference velocity associated with the velocity profile to the driver. The driver can manually drive the vehicle at a velocity as close as possible to the reference velocity. Alternatively, the remote device can be coupled to a cruise control system used to automatically control the vehicle velocity to be close or equal to the reference velocity associated with the velocity profile.

Alternatively, after receiving GPS and route information from remote device 210, central server 220 can send select traffic signal data to the remote device 210 for processing at the remote device. For instance, based on the GPS and route information received from remote device 210, central server 220 can sort through traffic signal data and provide select traffic signal data associated with the vehicle location and route information to the remote device 210. Remote device 210 can then determine a velocity profile and reference velocity according to the methods and techniques discussed in detail below.

Figure 3:
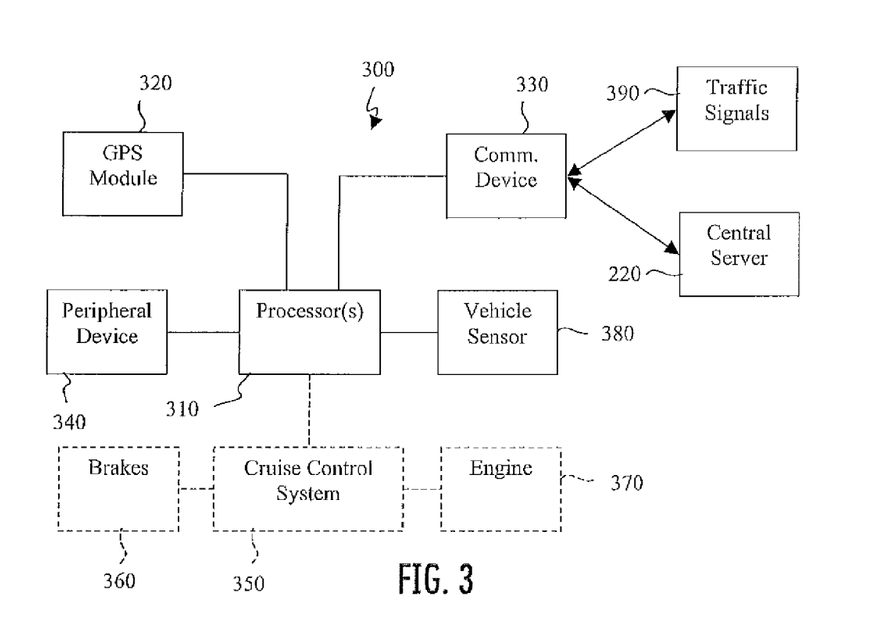
FIG. 3 depicts a block diagram of an exemplary system according to an exemplary embodiment of the present disclosure.

FIG. 3 illustrates yet another embodiment of the present disclosure. In the system 300 of FIG. 3, a communication device 330 receives traffic signal data from either a plurality of traffic signals 390 as illustrated in FIG. 1 or from a central server 220 as illustrated in FIG. 2. System 300 can be associated with a portable remote device, such as a smart phone, PDA, or other device, carried by a driver of a vehicle. Alternatively, system 300 can be integrated or retrofitted with a vehicle.

System 300 includes processor(s) 310, GPS module 320, communication device 330, and one or more peripheral devices 340. GPS module 320 is used by system 300 to determine the current position and velocity for the vehicle. GPS module 320 can be any of a variety of known GPS devices. GPS module can be a part of a remote device such as a smart phone, PDA, or other suitable remote device. Alternatively, GPS device can include an on-vehicle GPS device, such as an OnStar device, SOS device, or other suitable GPS device. GPS module 320 provides GPS information to processor(s) 310.

Communication device 330 is used to receive traffic signal data. Communication device 330 can be any suitable communication device for receiving traffic signal data transmitted from a plurality of traffic signals 390 or from a central server 220. Traffic signal data can be received from a plurality of traffic signals 390 or from a central server 220. Communication device 330 provides traffic signal data to processor(s) 310.

System 300 includes its own processor(s) 310. Processor(s) 310 is configured to determine a velocity profile and reference velocity based on traffic signal data. Similar to processor 220 of FIG. 2, processor 310 can be adapted to perform any of the methods or techniques for determining a velocity profile through a plurality of traffic signals based on traffic signal data discussed herein.

Processor(s) 310 is coupled to one or more peripheral devices 340 for communicating a velocity profile and reference velocity to a driver. Peripheral devices 340 can be any of a variety of user interfaces, visual displays, input/output devices, or other devices. For instance, in one embodiment, peripheral device 340 can be a visual display that displays a reference velocity or a reference velocity to the driver of the vehicle. In another embodiment, peripheral device 340 can also be a user interface that allows a driver to input maximum speed constraints for use in embodiments of the present disclosure. In still another embodiment, peripheral device 340 can be an alert device, such as a visual or audio alarm, that provides an indication to a driver of the vehicle that the vehicle is drifting from a determined reference velocity.

Processor(s) 310 can also receive data from vehicle sensor 380. Vehicle sensor 380 can be a laser, radar, or other sensing device that detects the distance between the vehicle and a vehicle traveling in front of the vehicle. As discussed in detail below, the distance between the vehicle and front vehicle can be used in accordance with certain aspects of the present disclosure to determine a velocity profile through a plurality of traffic signals. Sensor 380 can also include other vehicle sensors, such as wheel speed sensors, differential speed sensors, or other suitable sensors.

As illustrated, processor(s) 310 can also be coupled to a cruise control system 350. Cruise control system 350 can send control signals to the vehicle brakes 360 or the vehicle engine 370 to control the velocity of the vehicle. The cruise control system 350 can be used to automatically control the vehicle velocity to be close or equal to the reference velocity associated with the velocity profile.

An exemplary method for determining a reference velocity will now be discussed in detail. First, a set of logical rules for determining a reference velocity for timely arrival at green traffic signals will be set forth. Second, a model predictive control framework (MPC framework) will be discussed to allow the vehicle to track the reference velocity that provides a desired velocity profile through a plurality of traffic signals taking into account various constraints, including speed limits, engine and brake force limits, and minimum safe following distances behind other vehicles. The MPC framework may be used in connection with cruise control technology to vary control inputs, such as brake force and engine force, so that the vehicle tracks the determined reference velocity.

A reference velocity $v_{ref}$ is determined based on the driver's current velocity or set cruise speed and the traffic signal data received from upcoming traffic signals. The methodology either (1) increases $v_{ref}$ up to a maximum allowable velocity when there is enough green time to pass, or (2) decreases $v_{ref}$ down to a minimum allowable velocity, to arrive at the next green.

This can all be accomplished considering the driver's set cruise control velocity when embodiments of the present disclosure are used in accordance with a cruise control system. As used herein, the term "driver's set cruise control velocity" is intended to refer to the velocity of the vehicle set on the driver's cruise control. A cruise control system typically controls brake and engine force to maintain vehicle velocity close to the driver's set cruise control velocity.

Figure 4:
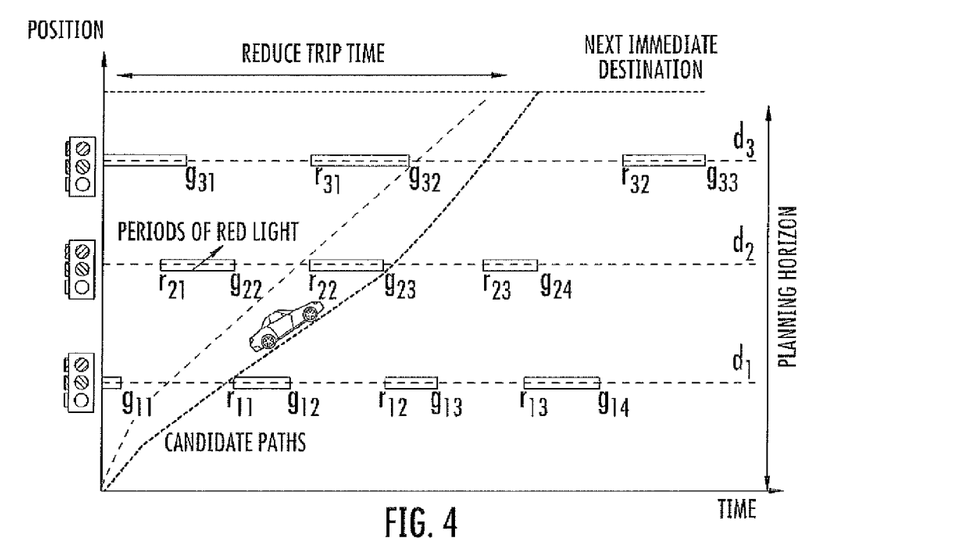
FIG. 4 provides a graphical representation of traffic signal data distributed over space time as well as exemplary vehicle trajectories through the traffic signals.

From the received traffic signal data, the approximate distance to the next traffic signal is known at each time and is designated by $d_i$ where I denote the traffic signal number in the sequence of traffic signals. In other words, $d_1$ is the distance to the first upcoming traffic signal and $d_2$ is the distance to the second upcoming traffic signal. The traffic signals update and transmit an expected sequence of their green and red phases. $g_{ij}$ is the start of the $j^{th}$ green of the $n^{th}$ traffic signal and $r_{ij}$ is the start of the $j^{th}$ red of the $i^{th}$ traffic signal. Exemplary traffic signal data transmitted from a traffic signal may include a sequence as follows:

$$[g_{11}, r_{11}, g_{12}, g_{13}, \ldots,] = [40, 100, 150, 200, 240, \ldots]$$

which implies the first traffic signal is currently red; it will turn green in 40 seconds; red in 100 seconds; green again in 150 seconds; red again in 200 seconds; and so forth. FIG. 4 shows an exemplary graphical representation depicting traffic signal data received from the traffic signals.

Equipped vehicles can use the remaining distance to the next traffic signal(s) and the green and red sequence information to determine a reference velocity. The reference velocity should be in the feasible range of $[v_{max}, v_{max}]$ where $v_{min}$ is the road's minimum speed limit and $v_{max}$ is the smaller of one of two thresholds: (1) the driver's set cruise control velocity, or (2) the maximum speed limit. Other constraints such as acceleration constraints, maintaining safe distance to the front vehicle, and reducing use of brakes are handled separately by the MPC framework.

The following steps determine the reference velocity at each step k:

1) For a vehicle to pass during the first green of the first traffic signal, its velocity should be in the interval $$\left[\frac{d_1}{r_{11}}, \frac{d_1}{g_{11}}\right].$$

This is only feasible if this interval has an intersection with the feasible velocity interval of $[v_{min}, v_{max}]$. If this set intersection is empty, passing through the first green without stopping at red is deemed infeasible. In that event, feasibility of passing during the next green interval is checked and the process is repeated until for some $i^{th}$ interval $$\left[\frac{d_1}{r_{11}}, \frac{d_1}{g_{11}}\right]$$

has a set intersection with $[v_{min}, v_{max}]$. This set intersection can be mathematically characterized by:

$$\left[\frac{d_1}{r_{1i}}, \frac{d_1}{r_{1i}}\right] \cap [v_{min}, v_{max}] \quad (1)$$

and determines the range of velocity that ensures passing the first signal without having to stop at red.

For example, assume the speed limits are $[v_{min}, v_{max}]=[5, 20]$ m/s and the distance to the first traffic signal is 1000 m. The first traffic signal transmits, $g_{11}=5$ s, $r_{11}=25$ s, $g_{12}=40$ s, $r_{12}=100$ s. Then $$\left[\frac{d_1}{r_{11}}, \frac{d_1}{g_{11}}\right] = [40, 200] \text{ m/s}.$$

This does not intersect with $[v_{min}, v_{max}]=[5,20]$ m/s. The second interval $$\left[\frac{d_1}{r_{12}}, \frac{d_1}{g2}\right] = [10, 25] \text{ m/s}$$

does intersect with $[v_1, v_{max}]=[5,20]$ m/s. Therefore, if the reference velocity of the vehicle is chosen between 10 m/s and 20 m/s, the vehicle passes the first traffic signal without having to stop. If no feasible set intersection is found, stopping at the traffic signal will be unavoidable.

2) If passing without stopping at the first traffic signal is determined to be feasible, the process in step 1) above is repeated for the second traffic signal by checking the set intersections $$\left[\frac{d_1}{r_{2i}}, \frac{d_1}{r_{2i}}\right] \cap [v_{min}, v_{max}]$$

and picking the first non-empty set.

3) Next, the set intersection of the feasible range of velocities determined step 1 and that of step 2 is calculated. A non-empty solution $]v_{low}, v_{high}]$ indicates feasibility of passing the two traffic signals without having to stop at a red. However, an empty solution does not imply that stopping at red is necessarily required. It only indicates that passing the two consecutive traffic signals with the same velocity is not feasible. In that event, the vehicle can readjust its determined reference velocity after passing the first traffic signal.

4) The process is continued by checking the next traffic signals until a stop at red becomes unavoidable. The last feasible range $]v_{low}, v_{high}]$ includes an appropriate reference velocity. To provide for the shortest trip time, $v_{ref}$ can be set to $v_{high}$.

Once a reference velocity is determined, the reference velocity can be provided to a driver, either through visual or audio communication, so that the driver can manually maintain the velocity of the vehicle close to the reference velocity. Alternatively, the reference velocity can be provided to a cruise control system used to automatically control the vehicle velocity to be close or equal to the reference velocity.

The reference velocity can be updated at each sampling time and therefore may change at each instant based on vehicle position and the most recent traffic signal data received from the traffic signals. Determining a reference velocity based on various other constraints, tracking this reference velocity using a cruise control system, maintaining a safe distance to the front vehicle, and reducing use of brakes are handled can be handled using a car's standard adaptive cruise control system. One possible design is a Model Predictive Control (MPC) design presented next by the MPC framework discussed below.

The MPC framework methodology includes developing a simple model of the vehicle for calculating vehicle acceleration. This vehicle acceleration model is used to determine a trajectory through a plurality of traffic lights and to determine control inputs, such as inputs to control brake force and engine force, for a predictive control system.

The vehicle acceleration model is based on effective traction force of the engine $f_{engine}$, braking force $f_{brake}$ and road forced $f_d$. For the $i^{th}$ vehicle with mass $m_i$, the longitudinal dynamics based on the vehicle acceleration model is:

$$m_i \frac{d^2 x_i}{dt^2} = f_{engine}^i - f_{brake}^i + f_d^i \quad (2)$$

where $f_d^i$ lumps the road forces and aerodynamic drag, rolling resistance and grade forces together as follows:

$$f_d^i = -c_D v_i^2 - m_i g(\sin(\theta) + \mu \cos(\theta)) \quad (3)$$

where $\theta$ is road grade, $c_D$ is the lumped drag coefficient, $\mu$ is the coefficient of rolling resistance, and g is the gravitational acceleration. The $f_d^i$ term is treated as a measured disturbance and can be updated each sample time.

The differential equation set forth in (2) above can be written in the following state-space discretized form:

$$z_i(k+1) = A z_i(k) + B_u u_i(k) + B_w w_i(k)$$

$$y_i(k) = C z_i(k) \quad (4)$$

where $z_i=[x_i, v_i]^T$ is the state vector, $u_1=[f_{engine}, f_{brake}]^T$ is the control input, and $w_1=[f_h^i]$ is the measured disturbance. Other outputs can be introduced into the model to handle a gap inequality constraint as will be discussed later. The matrices $A \in \mathfrak{R}^{2 \times 2}$, $B_u \in \mathfrak{R}^{2 \times 2}$, $B_w \in \mathfrak{R}^{3 \times 1}$, $C \in \mathfrak{R}^{2 \times 2}$ are the discretized system matrices.

In accordance with one embodiment of the present disclosure, the methodology includes varying the control input, $u_i=[f_{engine}, f_{brake}]^T$ either manually or by a cruise control system, so as to maintain vehicle velocity as close as possible to the reference velocity while maintaining a safe distance to the front vehicle. These objectives along with the desire to reduce use of the brakes can be unified in control performance index for the MPC framework as follows:

$$J_i(k) = \sum_{j=K}^{k+P-1} \left[ w_1 (v_i(j) - v_{target}(j))^2 + W_2 (f_{brake}^i(j))^2 \right] \quad (5)$$

In the control performance index (5) above, $w_1$ and $w_2$ are penalty weights for each term. In this regard, the above control performance index penalizes both deviations from $v_{target}$ and use of brake force over a future prediction window of P steps. This is because reduced use of vehicle brakes indirectly contributes to fuel savings.

Using the above control performance index (5), the methodology according to embodiments of the present disclosure can reduce trip time by setting $v_{target}$ equal to the maximum feasible speed $v_{ref}$ calculated above.

The MPC framework can incorporate speed limit, engine and brake force limit, and minimum safe following distance as pointwise-in-time inequality constraints. The contraints should be satisfied over the future prediction horizon $\forall j \in \{k, k+1, \ldots, k+P-1\}$.

In accordance with certain embodiments of the present disclosure, the speed limit constraint can be provided by:

$$v_{min} \leq v_i(j) \leq v_{max} \quad (6)$$

where $v_{min}$ and $v_{max}$ are speed limits and can be smaller than the driver's set cruise control velocity.

In accordance with certain exemplary embodiments of the present disclosure, constraints on engine and brake force can be provided by:

$$0 \leq f_{engine}^{i}(j) \leq f_{acceleration} \quad (7)$$

where $f_{acceleration}^{max}$ and $f_{deceleration}^{max}$ can depend on tire and road conditions and also on maximum engine and braking torque capability.

In accordance with certain embodiments of the present disclosure, minimum safe distance between vehicle i and a front vehicle can be determined as a function of vehicle velocity as follows:

$$x_{target}(j) - x_i(j) \geq \alpha v_i(j) + \beta \quad (8)$$

where $\beta$ is a static gap parameter and determines the minimum gap needed when the vehicles are stopped and $\alpha$ is a dynamic gap parameter providing extra gap with increased vehicle velocity.

In certain aspects of the MPC framework according to embodiments of the present disclosure, when it is determined that a vehicle is approaching a red traffic signal, the traffic signal is considered similar to a stopped front vehicle and the position $x_{target}$ is fixed to the position of the red traffic signal. This ensures that the vehicle can be controlled to come to a stop with distance $\beta$ from the light ($x_{target}(j) \geq x_i + \beta$).

The MPC framework can be used to estimate control inputs, such as brake force and engine force, to track vehicle velocity as close as possible to the reference velocity while taking into consideration the speed limit constraints, engine and braking force restraints, and minimum following distance constraints. For instance, the methodology of the present disclosure can minimizing the control performance index (5) subject to the vehicle acceleration model (4) along with inequality constraints (6), (7), and (8) at each sample time to determine the sequence of the next $N \leq P$ control inputs $U_i(k) = [u_i(k), u_i(k+1), \ldots, u_i(k+N-1)]$ over the future horizon P. When $N<P$, the remaining control moves $[u_i(k+N), u_i(k+N+1) \ldots, u_i(k+P-1)]$ are assumed to be 0.

When the techniques discussed above are used in connection with a cruise control system, the entry of only the first entry of control sequence $U_i(k)$ is applied to determine control inputs, such as brake force or engine force, to track vehicle velocity as close as possible to the reference velocity while taking into consideration the speed limit constraints, engine and braking force restraints, and minimum following distance constraints. The optimization horizon can then be moved one step forward, model constraints can be updated if necessary, and the above process is repeated to obtained the next control sequence entry $U_i(k+1)$.

As will be illustrated in the examples that follow, the methodology and cruise control systems can be used to reduce fuel consumption and to reduce trip time. In the examples that follow, fuel consumption is estimated using Powertrain System Analysis Toolkit (PSAT) developed by Argonne National Laboratory. Argonne National Laboratory, "Powertrain System Analysis Toolkit," commercial software, available at http://transportation.anl.gov/software/PSAT/index.html.

Example #1

Simulations were performed using embodiments of the present disclosure to determine potential impact on fuel economy and trip time of a single vehicle when the future traffic signal information is used in accordance with the cruise control techniques discussed above.

The simulations were first run with the cruise control capabilities turned off. These simulations serve as a baseline for comparison. The simulations were then run with the cruise control capabilities using traffic signal data in accordance with exemplary embodiments of the present disclosure. The baseline vehicle simulation uses a MPC framework similar to that discussed above, except that the controller for the baseline vehicles sets $v_{target}$ equal to the driver's set cruise control velocity.

The need for a timely stop at a red traffic signal is enforced through constraint (8) and by fixing $x_{i+1}$ to the position of the traffic signal as soon as the traffic signal turns amber or yellow or if an upcoming traffic signal is found to be red.

Figure 5:
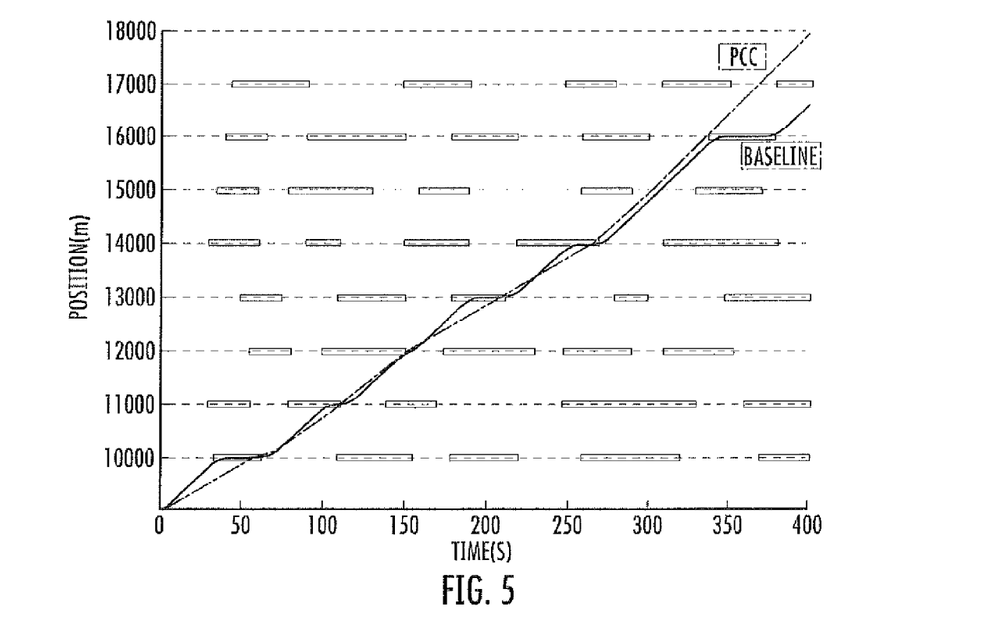
FIG. 5 provides a graphical representation of simulated velocity profile data for vehicles using techniques according to exemplary embodiments of the present disclosure and velocity profile data for vehicles without traffic signal data.

A sequence of ten traffic signals spaced at 1 km intervals was assumed for this example simulation. The traffic signal timing and phasing were chosen arbitrarily but within a reasonable range. The traffic signal timing and phasing were chosen to be fixed and independent of the incoming traffic. The traffic signal timing and phasing data is summarized in FIG. 5. FIG. 5 also depicts a graphical representation of the simulation results for vehicles using cruise control techniques according to exemplary embodiments of the present disclosure and velocity profile data for vehicles without traffic signal data.

In all simulations the driver set cruise control velocity was set to $v_{max}$=30 m/s, and the minimum speed $v_{min}$ is zero. The vehicle mass was set to 1000 kg. Maximum allowable engine and brake accelerations were calculated based on asphalt-rubber friction coefficient which was assumed to be 0.7. The parameters of the MPC framework are summarized in Table I below:

TABLE I

| Parameter | Description | value | Units (SI) |
| --- | --- | --- | --- |
| $T_s$ | sample time | 0.2 | S |
| P | prediction horizon | 8 | S |
| N | control horizon | 2 | S |
| $W_1$ | penalty weight 1 | 3000 | $(m/s)^{-2}$ |
| $W_2$ | penalty weight 2 | 150 | $N^{-2}$ |
| A | dynamic gap parameter | 0.2 | S |
| B | static gap parameter | 1 | S |
| $f_{acceleration}^{max}$ | max positive traction | 3000 | N |
| $f_{deceleration}^{max}$ | max negative traction | 6800 | N |

Figure 6:
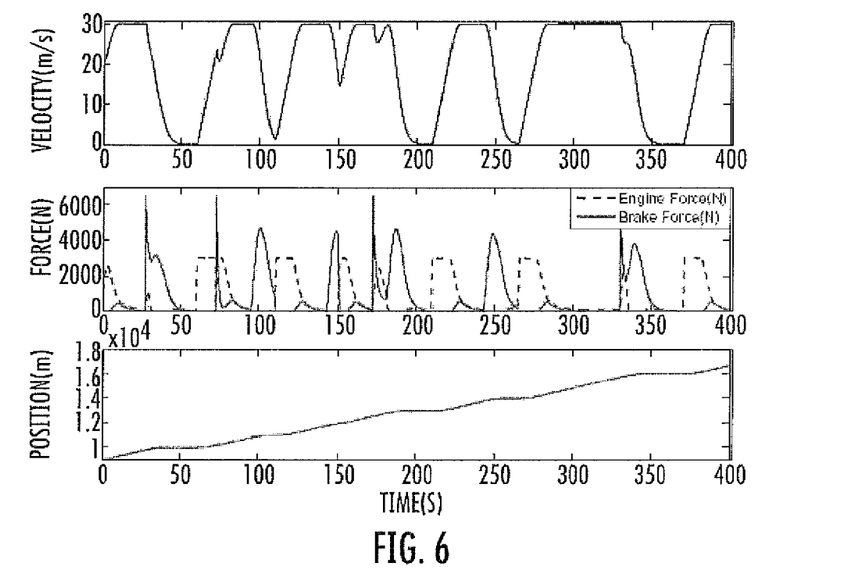
FIG. 6 provides a graphical representation of simulated velocity, control input, and position data for a vehicle without traffic signal data.

FIG. 6 depicts the velocity profile, control inputs, and the distance traveled by the baseline vehicle. Zero portions of the velocity profile show that the vehicle stops at multiple red signals. In a period of 400 seconds, the vehicle travels a distance of 7.66 km and passes 7 traffic signals. The average velocity is 19.55 m/s.

Figure 7:
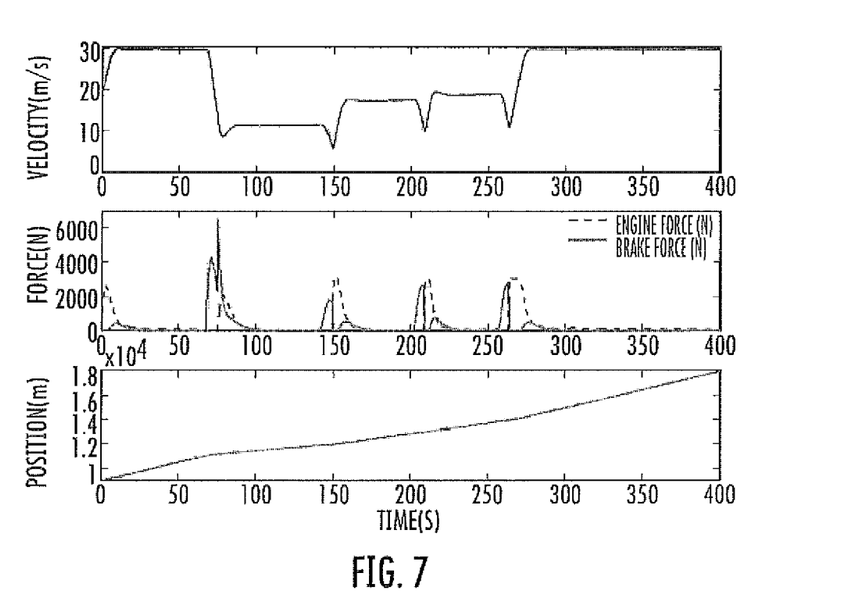
FIG. 7 provides a graphical representation of simulated velocity, control input, and position data for a vehicle using cruise control techniques according to exemplary embodiments of the present disclosure.

FIG. 7 depicts the velocity profile, control inputs and the distance traveled by a vehicle using techniques according to exemplary embodiments of the present disclosure. During the same time and with the same initial conditions, a vehicle equipped with cruise control capabilities according to embodiments of the present technology traveled 8.92 km. The average velocity is 22.32 m/s which is a 16.5 percent improvement over the baseline vehicle.

An economy-sized passenger vehicle with the mass of 1000 kg and 5-speed automatic transmission was selected for evaluating the fuel economy and $CO_2$ emissions in PSAT. The vehicle has a 1.7 L 4-cylinder gasoline engine with a maximum power of 115 hp. The detailed vehicle model is assembled in PSAT v.6.2 The velocity profiles of FIGS. 5 and 6 are fed as inputs to the PSAT simulation environment. The calculated fuel economy and $CO_2$ emissions are shown in Table II below. PCC indicates simulated values for vehicles equipped with cruise control techniques according to embodiments of the present disclosure.

TABLE II

| Value | PCC | Baseline |
|---|---|---|
| Fuel Economy (miles/gallon | 28.72 | 19.22 |
| $CO_2$ (g/mile) | 290 | 453 |

As shown in Table II, the cruise control techniques according to embodiments of the present disclosure can have a significant impact on fuel economy and $CO_2$ emissions.

Example #2

In this example, simulations were performed for a fleet of vehicles equipped with cruise control technology according to embodiments of the present disclosure. Each vehicle uses the MPC framework as discussed above with respect to Example #1. The vehicle and control parameters can vary between vehicles and this can be accounted for in the control design.

The former set of contraints in equations (6) and (7) of the MPC framework remain unchanged. However, when a vehicle is detected at a distance γ in front, the constraint in equation (8) is also activated with $x_{target}$ set as the position of the lead vehicle. Otherwise $x_{target}$ will be the position of the next targeted red traffic signal. The parameter γ can be chosen based on the vehicles maximum braking distance.

The simulations were first run with the cruise control capabilities turned off. These simulations serve as a baseline for comparison. The simulations were then run with the cruise control capabilities using traffic signal data in accordance with exemplary embodiments of the present disclosure. Each fleet has six vehicles aligned initially with the set of conditions shown in Table III below.

TABLE III

| Vehicle | Initial Position (m) | Initial Speed (m/s) |
|---|---|---|
| 1 | 9000 | 20 |
| 2 | 8950 | 25 |
| 3 | 8900 | 20 |
| 4 | 8800 | 25 |
| 5 | 8750 | 20 |
| 6 | 8720 | 15 |

Figure 8:
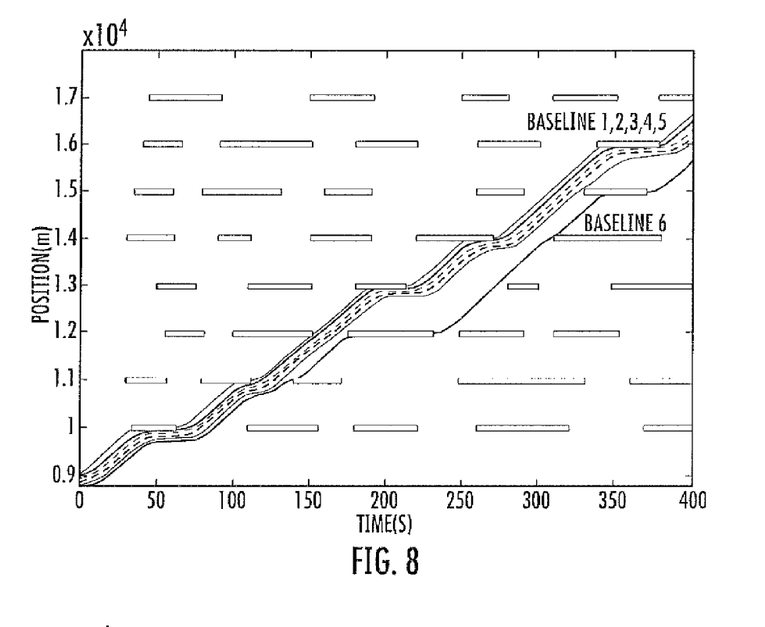
FIG. 8 provides a graphical representation of simulated trajectory data for a fleet of vehicles without traffic signal data.
Figure 9:
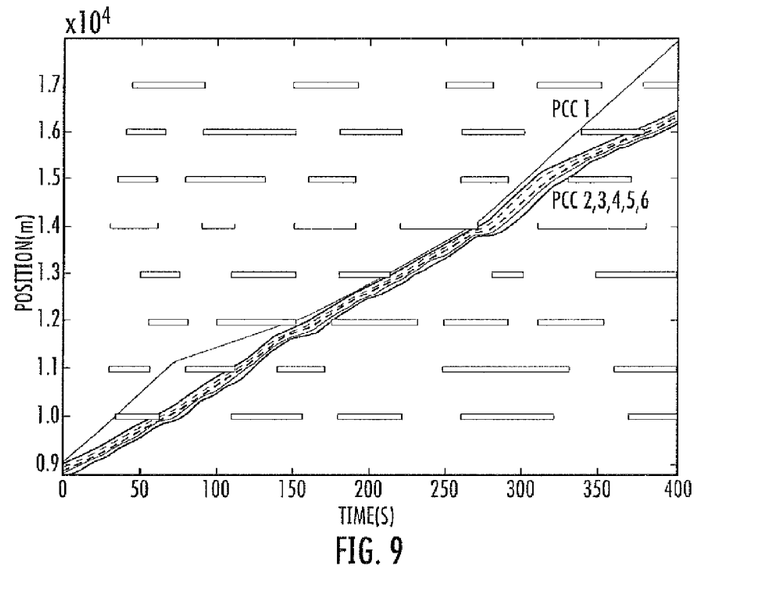
FIG. 9 provides a graphical representation of simulated trajectory data for a fleet of vehicles using cruise control techniques according to exemplary embodiments of the present disclosure.

FIG. 8 provides a graphical representation of simulated trajectory data for a fleet of vehicles without traffic signal data. FIG. 9 provides a graphical representation of simulated trajectory data for a fleet of vehicles using cruise control techniques according to exemplary embodiments of the present disclosure. The simulation period depicted in FIGS. 7 and 8 is equal to 400 seconds.

The distance traveled by each vehicle as well as the total distance traveled by each vehicle as well as the total distance traveled by the vehicles of each fleet during the 400 second simulation period are tabulated in Table IV.

TABLE IV

| Vehicle | 1 | 2 | 3 | 4 | 5 | 6 | Total |
|---|---|---|---|---|---|---|---|
| PCC (km) | 8.9 | 7.6 | 7.5 | 7.5 | 7.4 | 7.4 | 46.3 |
| Baseline (km) | 7.6 | 7.5 | 7.5 | 7.4 | 7.3 | 7.0 | 44.3 |

The average velocity of the fleet using cruise control techniques according to exemplary embodiments of the present disclosure is 19.31 m/s as compared to the 18.53 m/s of the baseline fleet, a 4.2% increase. The vehicle velocity trajectories for each fleet were input into a PSAT model to simulate fuel consumption and $CO_2$ emissions. The calculated fuel economy and $CO_2$ emissions are shown in Table V below.

TABLE V

| Vehicle | 1 | 2 | 3 | 4 | 5 | 6 | Average |
|---|---|---|---|---|---|---|---|
| PCC (km) | 28.7 | 27.7 | 27.9 | 28.1 | 28.1 | 27.5 | 28.0 |
| Baseline (km) | 19.2 | 19.7 | 20.2 | 21.3 | 20.3 | 17.3 | 19.7 |

As illustrated from the foregoing examples, the cruise control methods and systems of embodiments of the present disclosure has the potential to reduce fuel use and trip time by utilizing traffic signal information.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining a velocity for a vehicle traveling through a plurality of traffic signals, the method comprising:
   receiving first traffic signal data associated with a first traffic signal;
   receiving second traffic signal data associated with a second traffic signal;
   receiving position information associated with the vehicle, the position information comprising current location information for the vehicle; and
   determining a reference velocity for traveling through the first and second traffic signal without having to stop at a red signal;
   wherein the reference velocity is determined based at least in part on the first traffic signal data and the second traffic signal data.

2. The method of claim 1, wherein determining the reference velocity comprises:
   determining a first range of velocities for traveling through the first traffic signal without having to stop at a red signal, the first range of velocities being determined based at least in part on the first traffic signal data and the position information;
   determining a second range of velocities for traveling through the second traffic signal without having to stop at a red signal, the second range of velocities being determined based at least in part on the second traffic signal data and the CFP-S position information;

comparing the first range of velocities with the second range of velocities to determine a first set intersection between the first range of velocities and the second range of velocities, the first set intersection comprising a range of potential reference velocities for traveling through the first traffic signal and the second traffic signal without having to stop at a red signal; and selecting the reference velocity from the first set intersection.

3. The method of claim 2, wherein selecting the reference velocity from the first set intersection comprises selecting the reference velocity equal to the highest velocity in the first set intersection.

4. The method of claim 1, wherein the reference velocity is determined based at least in part taking into account speed limit constraints.

5. The method of claim 1, wherein the method comprises:
receiving updated position information associated with the vehicle;
updating the reference velocity based on the updated position information.

6. The method of claim 1, wherein the method further comprises:
determining at least one control input for a cruise control system for maintaining vehicle velocity at a controlled vehicle velocity that is substantially equal to the reference velocity;
wherein the at least one control input is determined based at least in part on speed limit constraints, braking force constraints, engine force constraints, or a minimum distance between the vehicle and a vehicle traveling in front of the vehicle.

7. The method of claim 1, wherein the first traffic signal data is received from the first traffic signal and the second traffic signal data is received from the second traffic signal.

8. The method of claim 1, wherein the first and second traffic signal data is received from a central server.

9. The method of claim 1, wherein the method further comprises:
receiving traffic signal data associated with one or more additional traffic signals;
determining a range of velocities to pass through each of the one or more additional traffic signals without having to stop at a red signal, the range of velocities being determined based at least in part on the traffic signal data associated with the one or more additional traffic signals; and
comparing the first set intersection with the range of velocities to determine a second set intersection between the first set intersection and the range of velocities, the second set intersection comprising a range of potential reference velocities for traveling through the first traffic signal, the second traffic signal, and the one or more additional traffic signals without having to stop at a red signal.

10. A system for determining a reference velocity for a vehicle traveling through a plurality of traffic signals, comprising:
a remote device associated with the vehicle;
a central server in communication with the remote device, the central server having a database configured to store first traffic signal data associated with a first traffic signal and second traffic signal data associated with a second traffic signal, the central server configured to receive position information associated with the vehicle from the remote device, the position information comprising location information for the vehicle;
a processor associated with the central server, the processor configured to execute computer readable instructions stored on a computer readable medium to determine a reference velocity for traveling through the first and second traffic signal without having to stop at a red signal;
wherein the reference velocity is determined based at least in part on the first traffic signal data and the second traffic signal data.

11. The system of claim 10, wherein the processor is configured to execute computer readable instructions stored on a computer readable medium to:
determine a first range of velocities for traveling through the first traffic signal without having to stop at a red signal, the first range of velocities being determined based at least in part on the first traffic signal data and the position information;
determine a second range of velocities for traveling through the second traffic signal without having to stop at a red signal, the second range of velocities being determined based at least in part on the second traffic signal data and the position information;
compare the first range of velocities with the second range of velocities to determine a set intersection between the first range of velocities and the second range of velocities, the set intersection comprising a range of potential reference velocities for traveling through the first traffic signal and the second traffic signal; and
select the reference velocity from the set intersection.

12. The system of claim 10, wherein the central server is configured to communicate the reference velocity to the remote device.

13. The system of claim 10, wherein the remote device is coupled to a cruise control system, the cruise control system configured to control the velocity of the vehicle to be substantially equal to the reference velocity.

14. The system of claim 13, wherein the processor is configured to determine at least one control input for the cruise control system, the at least one control input being determined based at least in part on speed limit constraints, braking force constraints, engine force constraints, or a minimum distance between the vehicle and a vehicle traveling in front of the vehicle.

15. The system of claim 10, wherein the remote device is an electronic device comprising an application adapted to:
connect to the central server;
provide the position information to the central server; and
receive the reference velocity from the central server.

16. The system of claim 10, wherein the remote device is an electronic device comprising an application adapted to:
connect to the central server;
receive first traffic signal data associated with a first traffic signal from the central server;
receive second traffic signal data associated with a second traffic signal from the central server; and
determine a reference velocity for traveling through the first and second traffic signal without having to stop at a red signal, the reference velocity being determined based at least in part on the first traffic signal data and the second traffic signal data.

17. A system for determining a reference velocity for a vehicle traveling through a plurality of traffic signals, the system comprising:

a communication device operable to receive first traffic signal data associated with a first traffic signal and second traffic signal data associated with a second traffic signal;

a GPS module adapted to determine the location of the vehicle;

a processor configured to receive the first and second traffic signal data from said receiver and to receive position information from said GPS module, the position information comprising the location information for the vehicle;

wherein said processor is configured to execute computer readable instructions stored on a computer readable medium to determine a reference velocity for traveling through the first and second traffic signal without having to stop at a red signal, the reference velocity being determined based at least in part on the first traffic signal data and the second traffic signal data.

18. The system of claim 17, wherein the communication device is configured to receive first traffic signal data from the first traffic signal and second traffic signal data from the second traffic signal.

19. The system of claim 17, wherein the communication device is configured to receive first traffic signal data and second traffic signal data from a central server.

20. The system of claim 17, wherein the system is coupled to a cruise control system, the processor is configured to determine at least one control input for the cruise control system, the at least one control input being based at least in part on speed limit constraints, braking force constraints, engine force constraints, or minimum distance between the vehicle and a vehicle traveling in front of the vehicle.

* * * * *